United States Patent [19]

Moriguchi

[11] Patent Number: 4,476,421

[45] Date of Patent: Oct. 9, 1984

[54] STEPPER MOTOR EXCITING CIRCUIT

[75] Inventor: Fujio Moriguchi, Kanagawa, Japan

[73] Assignee: Fuji Xerox Co., Ltd., Tokyo, Japan

[21] Appl. No.: 471,611

[22] Filed: Mar. 3, 1983

[30] Foreign Application Priority Data

Mar. 8, 1982 [JP] Japan .................................. 57-35175

[51] Int. Cl.³ ............................................ H02K 29/04
[52] U.S. Cl. ................................... 318/696; 318/685
[58] Field of Search ............... 318/696, 685; 368/156, 368/157

[56] References Cited

U.S. PATENT DOCUMENTS 4,145,644 3/1983 Liu ..................................... 318/696

FOREIGN PATENT DOCUMENTS 2006995 5/1979 United Kingdom .

Primary Examiner—Joseph V. Truhe
Assistant Examiner—Saul M. Bergmann
Attorney, Agent, or Firm—Sughrue, Mion, Zin, Macpeak and Seas

[57] ABSTRACT

An exciting circuit for a stepper motor requiring only a single decoder device yet being capable of controlling the speed of the stepper motor using plural different modes of excitation. A memory stores digital data representing a predetermined sequence of activation of the exciting coils. A counter drives the address input port of the memory in accordance with its output count. A clock signal generator supplies clock pulses to the counter in one of two patterns, representative of high and low speeds. The first of the patterns contains clock pulses spaced at equal intervals with a frequency such that the stepper motor can follow the corresponding changes in activation of the exciting coils of the motor. In the second pattern, the clock signals are supplied in bursts, the internal frequency of which is higher than the stepper motor can follow. In this latter case, portions of the normal excitation sequence are effectively omitted, thereby driving the motor at a different speed.

9 Claims, 10 Drawing Figures

STEPPER MOTOR EXCITING CIRCUIT

BACKGROUND OF THE INVENTION

The present invention relates to a stepper motor exciting circuit. Stepper motors have been extensively employed as a source of rotary power for conveying a recording sheet. A facsimile system is an example where such motors are used. In a recording sheet conveying mechanism, in order to reduce the recording time, the recording sheet is preferably moved at high speed for lines in which no data is recorded. For this purpose, it is necessary to provide a stepper motor exciting circuit which can switch the stepper motor among a plurality of speeds.

FIG. 1 shows a conventional stepper motor exciting circuit of this type. In this circuit, first terminals of two-phase exciting coils 1 and 2 are connected through a resistor 3 to a power supply terminal 4, while the other terminals of the exciting coils are selectively grounded through respective switching transistors 5 and 6. Similarly, first terminals of two-phase exciting coils 7 and 8 are connected through a resistor 9 to the power supply terminal 4, and the other terminals thereof are selectively grounded through respective switching transistors 11 and 12. The bases of the switching transistors 5, 6, 11 and 12 are connected to corresponding terminals of a changeover circuit 13. Four output terminals of a first decoder 14 and four output terminals of a second decoder 15 are connected to the input side of the changeover circuit 13. A counter 17 counts pulses of a clock signal 16 and supplies a signal representing the count value to the decoders 14 and 15.

In accordance with the count value of the counter 17, the first decoder 14 outputs a signal for "two-phase" excitation, for instance, while the second decoder 15 outputs a signal for "W1-2 phase" excitation, for instance. The changeover circuit 13 provides the output signal of the first decoder 14 or the output signal of the second decoder 15 at the four output terminals thereof according to an excitation changeover signal 18. As a result, the excitation system of the stepper mtor can be switched between the "two-phase" excitation mode or to the "W1-2 phase" excitation mode to change the speed of rotation of the stepper motor.

This stepper motor exciting circuit is disadvantageous in that it is intricate, and accordingly expensive, because it is necessary to provide as many decoders as there are modes of excitation.

SUMMARY OF THE INVENTION

In view of the foregoing, an object of the invention is to provide a stepper motor exciting circuit in which only one type of decoder is needed to switch among a plurality of excitation modes.

The foregoing object of the invention has been achieved by the provision of a stepper motor exciting circuit which, according to the invention, includes clock pulse generating means for generating selectively a high speed pulse signal which the rotor of the step motor cannot follow and a low speed pulse which the rotor can follow, a hexademical counter for counting the pulses of the pulse signals generated by the clock pulse generating means, and decoder means for selecting an excitation phase and controlling phase currents with a "W1-2 phase" excitation sequence according to the count value of the counter so that portions of the phase excitation sequence generated when the clock pulse generating means produces the high speed clock pulse are effectively skipped, whereby an optimal excitation system can be selected.

DESCRIPTION OF THE PREFERRED EMBODIMENTS

The invention will now be described in more detail with reference to preferred embodiments.

Figure 1:
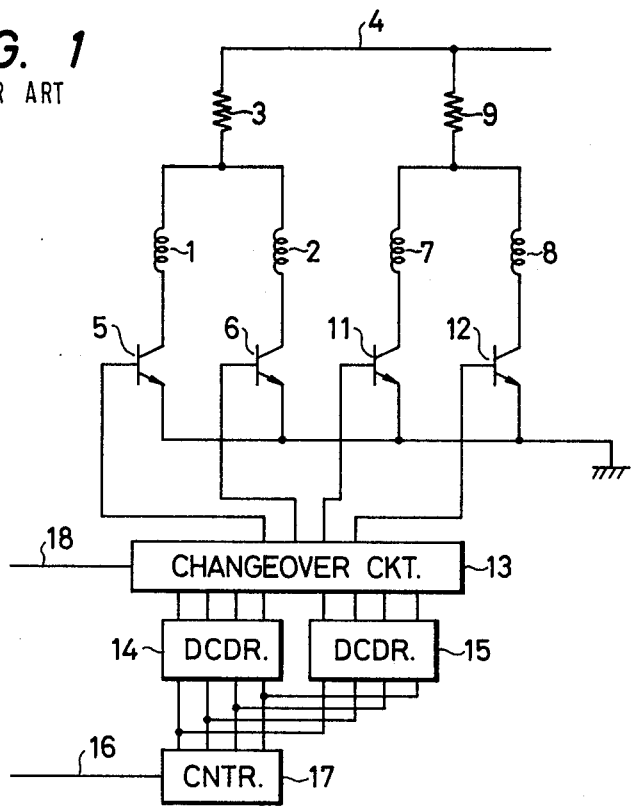
FIG. 1 is a circuit diagram showing a conventional stepper motor exciting circuit.
Figure 2:
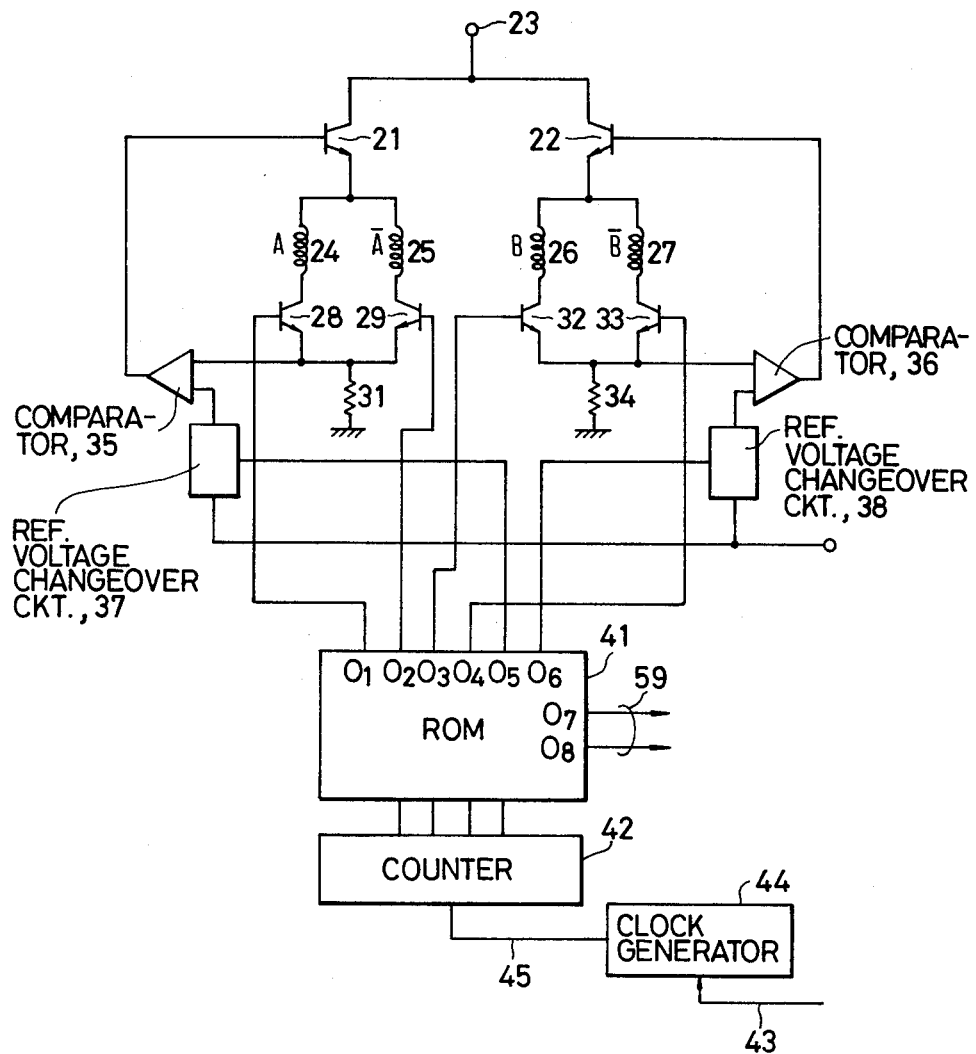
FIG. 2 is a circuit diagram of a stepper motor exciting circuit according to the invention.

FIG. 2 shows a stepper motor exciting circuit constructed in accordance with the teachings of the invention. In this exciting circuit, a chopper constant current device system is employed in order to improve the efficiency of the power source. That is, instead of the two resistors 3 and 9 in FIG. 1, two chopper transistors 21 and 22 are provided. The collectors of the chopper transistors 21 and 22 are connected to one terminal 23 of a motor driving power source. The emitter of the first chopper transistor 21 is connected to first terminals of bifilar-wound "A phase" and "$\overline{A}$ phase" exciting coils 24 and 25. Similarly, the emitter of the second chopper transistor 22 is connected to first terminals of bifilar-wound "B phase" and "$\overline{B}$ phase" exciting coils 26 and 27. The other terminals of the exciting coils 24 and 25 are connected, respectively, through switching transistors 28 and 29 to one terminal of a first current detecting resistor 31, the other terminal of which is grounded. Similarly, the other terminals of the exciting coils 26 and 27 are connected, respectively, through switching transistors 32 and 33 to one terminal of a second current detecting resistor 34, the other terminal of which is grounded. The voltages developed across the current detecting resistors 31 and 34 are applied to respective inputs of first and second comparators 35 and 36 where the voltages are compared with reference voltages provided by first and second reference voltage changeover circuits 37 and 38. The outputs of the comparators 35 and 36 are applied to turn on and off the first and second chopper transistors, respectively, and hence control the currents flowing through the exciting coils 24 through 27.

The on-off control of the switching transistors 28, 29, 32 and 33 and the voltage changeover control of the first and second reference voltage changeover circuits 37 and 38 are instructed by a read-only memory 41, the address input port of which is connected to a counter 42. When a motor clock signal 45, which is outputted by a clock generator 44 in response to a speed changeover signal 43, changes state, the counting speed of the counter 42 changes, and hence the control operation of the read-only memory 41 is changed.

Figure 3:
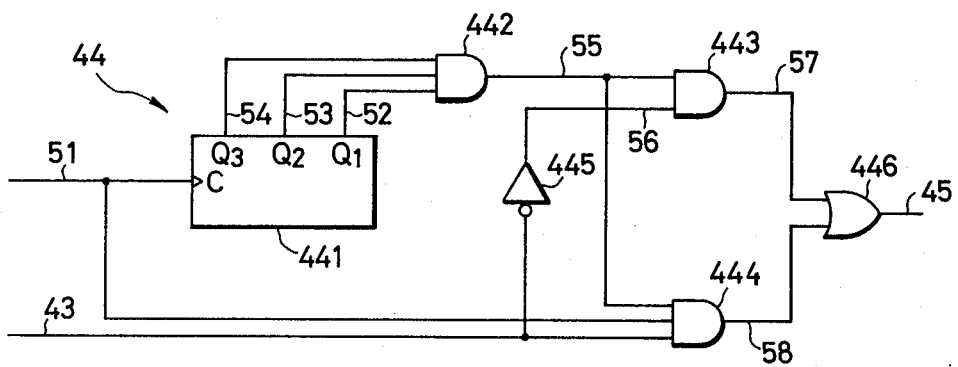
FIG. 3 is a circuit diagram showing an example of a clock generator used in the circuit of FIG. 2.

FIG. 3 shows the clock generator 44 in more detail. The clock generator 44 includes a binary counter 441 to the clock terminal C of which a basic clock signal 51

Figure 4:
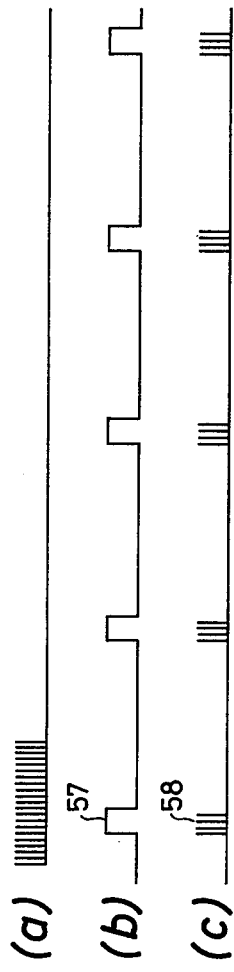
FIGS. 4a–4c are waveform diagrams used for a description of the operation of the clock generator of FIG. 3.

(waveform (a) in FIG. 4) is applied. First, second and third clock signals 52, 53 and 54, which are obtained by frequency dividing the basic clock signal 51 by factors of ⅛, 1/16 and 1/64, respectively, are provided at corresponding first, second and third output terminals $Q_1$, $Q_2$ and $Q_3$ of the binary counter. The clock signals 52, 53 and 54 are applied to a three-input AND gate 442 where they are ANDed to produce a fourth clock signal 55. The fourth clock signal 55 is applied to first input terminals of a two-input AND gate 443 and a three-input AND gate 444. A changeover signal 43 is applied to an inverter 445, which in turn outputs a changeover signal 56. The changeover signal 56 is applied to the remaining input terminal of the AND gate 443. The changeover signal 43 and the basic clock signal 51 are applied to the remaining input terminals of the AND gate 444.

When the stepper motor operated by this circuit is to be driven at low speed, the changeover signal 43 is set to the low (L) logical level, whereupon the two-input AND gate 443 outputs a "W1-2 phase" excitation clock signal 57 (waveform (b) of FIG. 4). When the stepper motor is to be driven at high speed, the changeover signal 43 is raised to the high (H) logical level, and a "two-phase" excitation clock signal 58 (waveform (c) in FIG. 4) is outputted. These signals are ORed by an OR gate 446, which outputs, in turn, a motor clock signal 45 which is supplied to the counter 42 (FIG. 2).

The operation of the circuit in the case of driving the stepper motor at low speed with the above-described clock generator 44 will be described. In this operation, the "W1-2 phase" excitation clock signal 57 is supplied, as the motor clock signal 45, to the counter 42, where the pulses of the signal 57 are counted. The counter 42 is a hexadecimal counter which counts the pulses of the motor clock signal 45 at equal intervals. The count value is applied to the read-only memory 41. In response to the count value, the read-only memory 41 outputs signals for selecting a excitation phase and setting a phase current with a "W1-2 phase" sequence.

Figure 5:
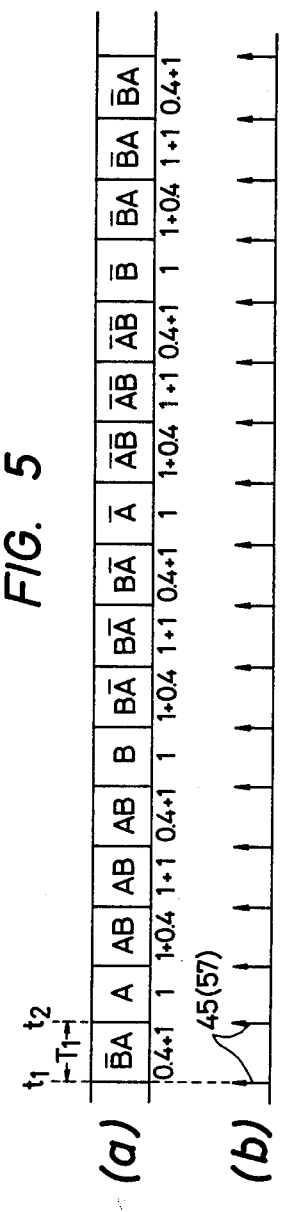
FIGS. 5a–5d are timing charts showing the relationship in time between motor clock signals and excitation phases.
Figure 5:
Figure 5:
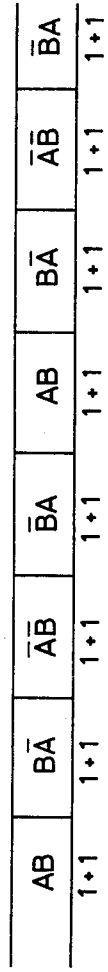

FIG. 5 shows the relationships between the motor clock signal 45 and the excitation phases. As the motor clock signal 45 contains pulses at constant intervals (as shown at (b) in FIG. 5), the excitation phases are activated one by one, as shown at (a) in FIG. 5. For instance, when the read-only memory 41 selects an excitation from of $\overline{BA}$ phase in response to the motor clock signal pulse which occurs at the time instant $t_1$, the following signal states are provided at the output terminals $O_1$ through $O_6$ of the read-only memory 41: $O_1$=H, $O_2$=L, $O_3$=L, $O_4$=H, $O_5$=H, and $O_6$=L.

In this case, the signals at the first and fourth output terminals $O_1$ and $O_4$ are at the "H" level, and therefore the switching transistors 28 and 33 are rendered conductive (on) so that the "A phase" and "B phase" coils are excited. As the signal at the fifth output terminal $O_5$ is at the "H" level, the first reference voltage changeover circuit 37 applies the higher of the two different reference voltages to the first comparator 35. Comparing this reference voltage to a voltage which is developed across the current detecting resistor 31, the first comparator 35 performs a constant current control operation which causes a current of one ampere to flow in the "A phase" exciting coil 24. On the other hand, the signal at the sixth output terminal $O_6$ is at the "L" level. Therefore, the second comparator 36 compares the lower reference voltage to a voltage which is developed across the current detecting resistor 34 and accordingly performs a constant current control operation such that a current of 0.4 ampere flows in the "$\overline{B}$ phase" exciting coil 33. Numerical values indicated in the lower portion of part (a) of FIG. 5 represent phase currents. When a motor clock signal (45) pulse occurs after a first period of time $T_1$ (at the time instant $t_2$), the excitation phase and the phase current are changed. In this case, the following signal states are present at the output terminals $O_1$ through $O_6$: $O_1$=H, $O_2$=L, $O_3$=L, $O_4$=L, $O_5$=H, and $O_6$=(not applicable). (It is unnecessary to indicate the level of the signal at the output terminal $O_6$ because the "B phase" and "$\overline{B}$ phase" coils are not excited in this case.)

Similarly, as in the above-described case, whenever a pulse of the motor clock 45 occurs, the excitation phase and the phase current are changed. Thus, the stepper motor is driven at low speed according to the "W1-2 phase" excitation mode.

The operation of the circuit in the case of driving the stepper motor at high speed will now be described. When the changeover signal 43 is at the "H" level, the "two-phase" excitation clock signal 58 is supplied as the motor clock signal 45 to the counter 42, which counts the pulses of the signal 45. In this case, four motor clock signal pulses are provided in the form of a high frequency bunch, as shown at (c) in FIG. 5. Accordingly, the read-only memory 41 outputs signals which cause selection of phase excitation and setting a phase current such that excitation in the "W1-2 phase" mode is skipped every fourth step.

When four clock pulses are produced at high speed under the condition that, for instance, an excitation form of AB phase in which a current of one ampere flows both in the "A phase" exciting coil 24 and in the "B phase" exciting coil 26 (part (d) in FIG. 5), the read-only memory 41 sequentially changes the signals provided at the output terminals $O_1$ through $O_6$ at a corresponding speed. If the four-clock-pulse generation interval is set to several microseconds, the stepper motor will not be able to follow this change, and accordingly excitation of the stepper motor will be carried out with the excitation form and the phase current which are selected by the fourth clock pulse only; that is, the stepper motor is excited in an excitation form of $\overline{BA}$ phase in which case a phase current of one ampere flows in the "B phase" exciting coil 26.

Thereafter, similar to the above-described case, whenever four motor clock pulses are produced as described above, the excitation form of the stepper motor is changed; that is, the excitation takes the forms of AB phase, BA phase, $\overline{AB}$ phase, etc. Thus, substantially "two-phase" excitation sequence is carried out.

On the other hand, a two-bit monitor signal 59, which represents four variations of phase current, is outputted upon the remaining two output terminals $O_7$ and $O_8$. The monitor signal 59 is applied to a control circuit (not shown) for monitoring the phase excitation. In the case of single phase excitation, the control circuit supplies two dummy pulses to the counter 42 for the above-described two-phase excitation. Thereafter, four motor clock pulses 45 are produced every time, so that the stepper motor is driven with the sequence appropriate for single-phase excitation, that is, "A phase", "B phase", "$\overline{A}$ phase" and "$\overline{B}$ phase".

As has been described in detail, according to the invention, the pulse sequence for "W1-2 phase" excitation is partially omitted for low speed operation, whereby the step motor can be driven according to various excitation systems and according to a given load and a desired speed of rotation. Hence, an optimum driving form is provided.

In the description above, the "W1-2 phase" excitation sequence is skipped every fourth step; however, the invention is not limited thereby or thereto. For instance, "1-2 phase" excitation can be carried out by generating two motor clock signal pulses at high speed for every pulse period.

I claim:

1. An exciting circuit for a stepper motor having a plurality of pairs of exciting coils, one of said pairs being provided for each of a plurality of phases, comprising:
   memory means for storing digital data representing a predetermined sequence of activation of said exciting coils;
   means for activating said exciting coils in response to outputs of said memory means;
   counter means for addressing said memory means with a count of a number of pulses of a clock signal applied to said counter means; and
   clock signal generating means for producing at least first and second sequences of clock pulses in response to a speed control signal, said first sequence of clock pulses containing only clock pulses at a frequency such that said stepper motor can follow all corresponding changes in activation of said exciting coils and said second sequence of clock pulses containing at least some bursts of clock pulses at a frequency sufficiently high that said stepper motor cannot follow the corresponding changes in activation of said exciting coils.

2. The stepper motor exciting circuit of claim 1, wherein said counter means comprises a hexadecimal counter for producing a repetitive binary count sequence in response to pulses of said clock signal applied to said counter means.

3. The stepper motor exciting circuit of claim 2, wherein said clock generating means comprises means for producing a first sequence of clock pulse signals having a duration in an active state greater than a repetition period of an input clock stream; means for gating said input clock stream signal with said first sequence of pulse clock signals; and means for selecting as said clock signal applied to said counter means one of said first sequence of pulse clock signals and said second sequence of pulse clock signals in response to said speed control signal.

4. The stepper motor exciting circuit of claim 1, wherein said means for activating said exciting coils comprises means for generating a reference voltage having a magnitude determined in response to an output from said memory means; comparator means for comparing said reference voltage with a voltage representing a magnitude of current flowing in a pair of said exciting coils; and means for controlling a current flow to said pair of exciting coils in accordance with an output of said comparing means.

5. An exciting circuit for a stepper motor having a plurality of pairs of exciting coils, one of said pairs being provided for each of a plurality of phases, said circuit comprising:
   a plurality of first switching elements, one of said switching elements being provided for each of said pairs of exciting coils, each of said first switching elements having a first and second signal terminal and a control terminal for controlling a current path between said first and second signal terminals, said first signal terminals of all of said first switching elements being coupled to a power source terminal and said second signal terminals of each of said first switching elements being coupled to first terminals of both exciting coils of a respective pair of said exciting coils;
   a plurality of pairs of second switching elements, one pair of said second switching elements being provided for each said pair of said exciting coils, each of said second switching elements having first and second signal terminals and a control terminal for controlling a current path between said first and second signal terminals, said first signal terminal of each of said second switching elements being coupled to a second terminal of a respective one of said exciting coils;
   a plurality of current sensing means, one of said current sensing means being provided for each of said pairs of exciting coils, each of said current sensing means being coupled between second signal terminals of a respective pair of said second switching elements and a second terminal of said power source;
   a plurality of comparators, one of said comparators being provided for each of said pairs of exciting coils, each of said comparators having first and second comparison signal input terminals and an output terminal, said first comparison signal input terminal of each of said comparators being coupled to said second terminals of a respective pair of said exciting coils and said output terminal of each of said comparators being coupled to said control terminal of a respective first switching element;
   a plurality of reference signal changeover circuit means for providing to said second comparison signal input terminal of a respective one of said comparators a reference signal of a magnitude determined by an input digital control signal, one of said reference signal changeover circuit means being provided for each of said pairs of exciting coils;
   memory means storing digital data representing a predetermined sequence of activation of said exciting coils, outputs of said memory means being coupled to said control terminals of respective ones of said second switching elements and applied as input digital control signals to respective ones of said reference signal changeover circuit means;
   counter means for producing a count at an output port thereof in response to pulses of a clock signal applied to an input terminal thereof, said output port being coupled to an address input port of said memory means; and
   clock signal generating means for producing predetermined sequences of clock pulses, applied to said input terminal of said counter means, in response to a speed control signal.

6. The stepper motor exciting circuit of claim 5, wherein each of said first and second switching elements comprises a bipolar transistor.

7. The stepper motor exciting circuit of claim 5, wherein each of said current sensing means comprises a resistor.

8. The stepper motor exciting circuit of claim 5, wherein said counter means comprises a hexadecimal counter.

9. The stepper motor exciting circuit of claim 5, wherein said clock signal generating means comprises: a binary counter, said binary counter having a clock input coupled to receive a continuous stream of clock pulses; a first AND gate having first through third inputs coupled to divide-by-eight, divided-by-sixteen and divided-by sixty-four outputs of said binary counter; an inverter having an input coupled to receive said speed control signal; a second AND gate having a first input coupled to an output of said first AND gate and an output of said inverter; a third AND gate having a first input coupled to said output of said first AND gate, a second input coupled to said clock input of said binary counter, and a third input coupled to said input of said inverter; and an OR gate having first and second inputs coupled to outputs of said second and third AND gates, respectively.

* * * * *